Feb. 16, 1954    J. PELLEGRINO    2,669,195
COOLING-DRYING AND CUTTING COMBINATION FOR MACARONI
MACHINES, AND AN IMPROVED METHOD OF
MAKING SQUARE-CUT MACARONI UNITS
Filed April 22, 1949    3 Sheets-Sheet 3
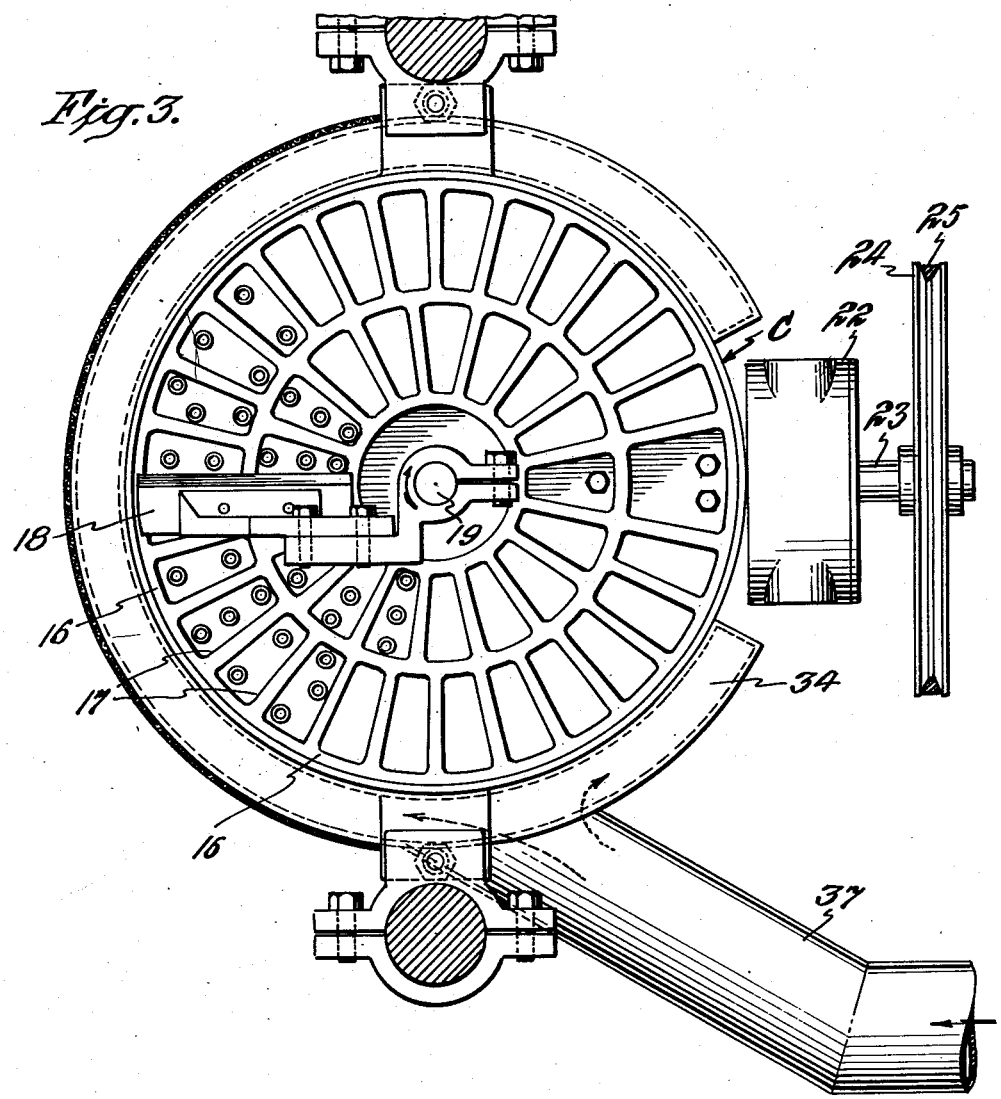
INVENTOR
JOSEPH PELLEGRINO
BY
ATTORNEY Patented Feb. 16, 1954

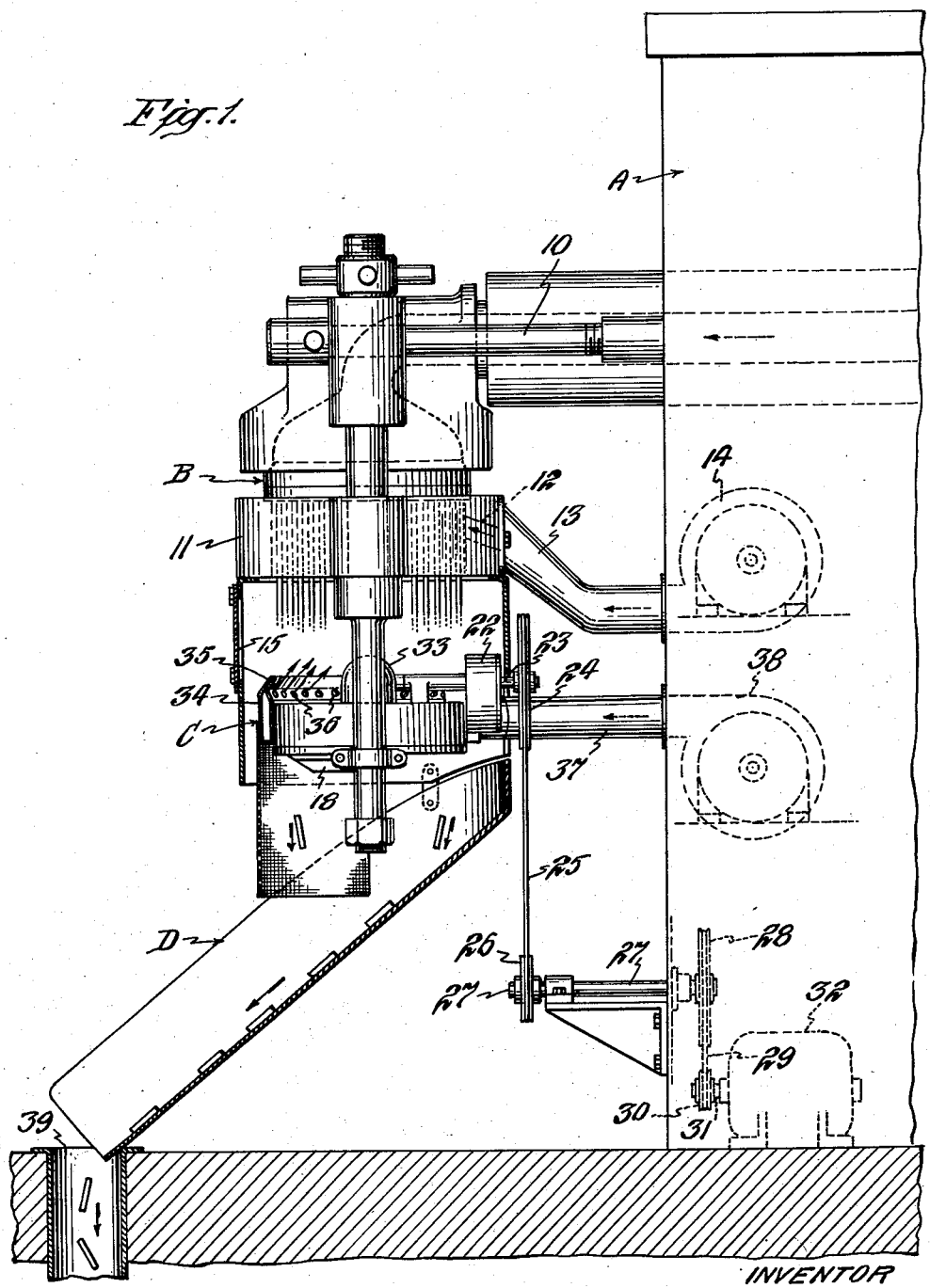

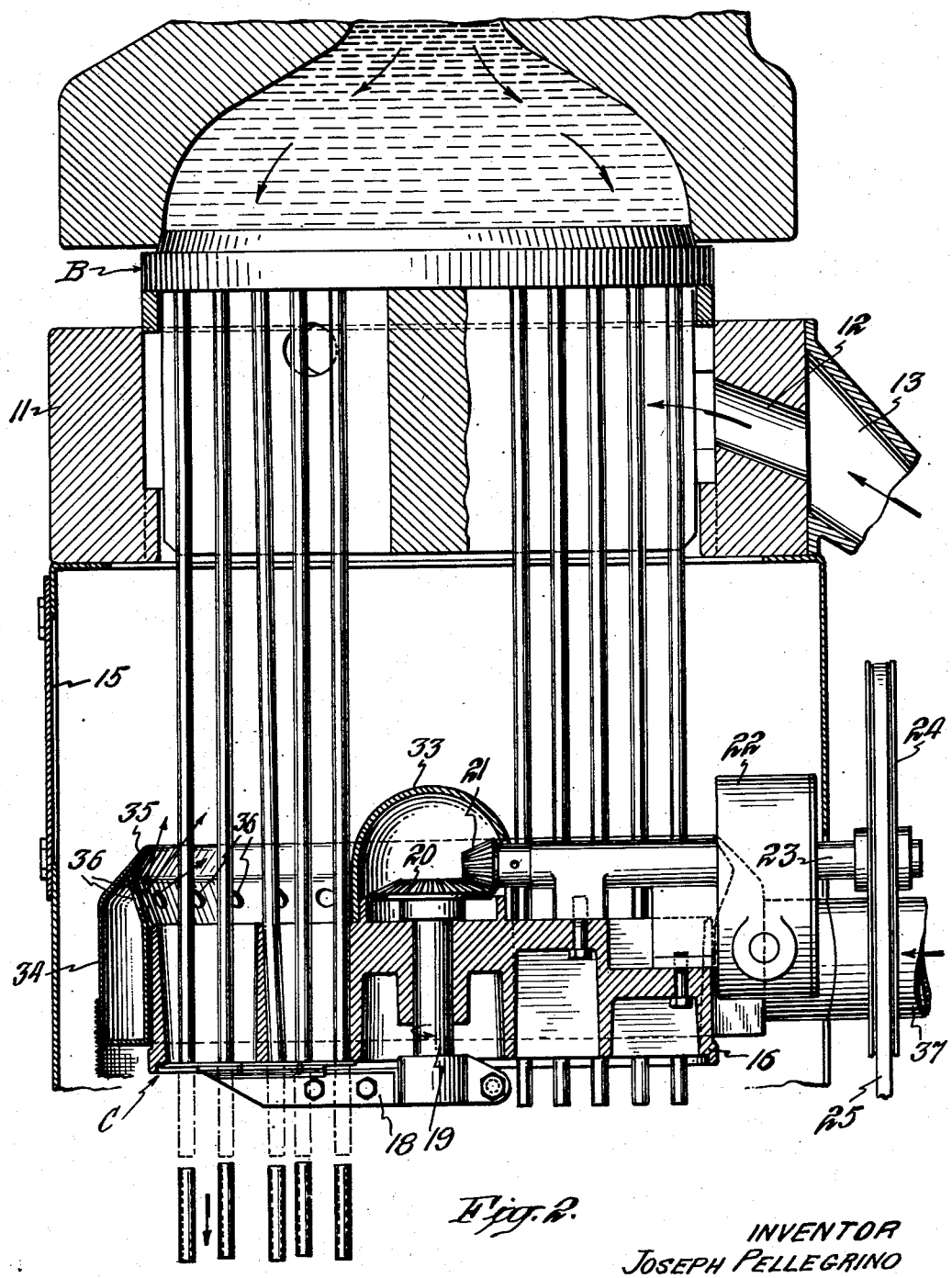

2,669,195

UNITED STATES PATENT OFFICE 2,669,195

COOLING-DRYING AND CUTTING COMBINATION FOR MACARONI MACHINES AND AN IMPROVED METHOD OF MAKING SQUARE-CUT MACARONI UNITS

Joseph Pellegrino, Andover, Mass., assignor to Anthony William Deller

Application April 22, 1949, Serial No. 89,108

7 Claims. (Cl. 107—54)

The present invention relates to new and useful improvements in machines for making pre-cut macaroni, and more particularly, to a novel cooling-drying and cutting combination for macaroni machines, and to an improved method of making square-cut macaroni units.

In the customary manufacture of macaroni hitherto employed, it has been the practice to extrude macaroni through a die or press to a length of about 44 inches and then place these lengths over a bar with their half lengths of about 22 inches hanging down. These suspended sections are then placed in a drying chamber for a period of time of about seven to about eight days to dry the macaroni to a moisture content of about 11% to about 12%. When it is thoroughly dried, it is taken off these bars and cut with a saw. The portion that has been hung over the bar forms a complete elbow bend which has to be cut out and removed. The remaining product is again cut in half to a length of approximately 11½ inches in order to fit into the ordinary one pound packages. Difficulty has also been encountered because the cut ends become cracked, split, etc. and tend to break off in a mass of fine particles resulting in waste.

The conventional method is very expensive and the material is very difficult to dry properly. Many times the products check in the drying process and, as a result, there is a cracking of the ends which is objectionable and which results in a complete loss. Material of this sort can only be used for feed or be reground and re-used by blending it with regular flour or semolina.

In the more modern method and machines for making macaroni, the material or dough is extruded through dies and then passed practically directly through a cutter head where rotating knives cut off the tubular material into appropriate lengths either square or on the slant to the longitudinal axis of the tube or in the form of a curve, such as a half moon. However, if the material when cut is not sufficiently dried and cooled, the action of cutting, especially the square cut, will tend to draw the ends of the tube together and deform them, which is unsightly and produces an unmarketable article due to uneven and improper drying, etc. Furthermore, such a restriction of the ends of the tube will make it much more difficult for the material to dry out uniformly even if the drying process is a natural one. Moreover, if the material is not dried enough, when it is cut, the ends will not only be deformed, but the ends will appear with longitudinal cracks which also make the article much less attractive and less marketable. As far as I am aware, no machine or method has been discovered which is wholly satisfactory, especially when carried into practice on an industrial scale for the manufacture of commercial product.

An object of the present invention is to provide a method and machine which will produce a novel macaroni product in the course of the manufacture, which eliminate the aforesaid expensive, time-consuming operations and waste, and which produce square-cut macaroni capable of being handled automatically, of being dried automatically, and of being cut automatically to produce a thoroughly dried square-cut macaroni product which is uniform in texture, open freely at both ends, clean-cut on the ends and without faults and cracks which have hitherto been the inevitable result of prior methods and machines.

It is also an object of the invention to provide an improved method and machine for producing a novel article consisting of predetermined units of marketable macaroni tubes which are square-cut, freely open on both ends, firm in texture, evenly dried and substantially consistent throughout, both on the outside as well as the inside whereby the article thus produced is attractive, extremely saleable to and acceptable by the trade and the public and contains none of the objectionable features of conventional cut macaroni.

A further object is to provide an improved method and machine whereby an improved square-cut macaroni can be produced with much more ease and rapidity, thus reducing the time involved and the cost for labor, heat, and other expenses.

Other and more specific objects, features, and advantages will more clearly appear from the detailed specification hereinafter set forth, especially when taken in connection with the accompanying drawings which illustrate a preferred embodiment of the invention, in which:

Fig. 1 illustrates a side elevation, partly in section, of the improved machine embodying the novel and useful features of the present invention;

Fig. 2 is an enlarged vertical cross-sectional view of the device from the dough hopper to and through the cutter head;

Fig. 3 depicts an inverted plan view of the cutter head and associated mechanism;

Fig. 4 shows a side elevation, partly broken away, of a cut section or unit of macaroni; and Fig. 5 is a cross section thereof showing an oval circle due to cutting pressure.

In general terms, the method comprises the extrusion of the dough through a die, its passage from the die through a substantial distance to a cutting head, and the subjection of the material to a blast of cooling and drying air in the passage from the die to the cutting head.

The method further includes the step of square-cutting the tubular dough thus cooled and dried and the subjection of it in association with the cutting operation to another blast of cooling-drying air. Preferably this blast of cooling-drying air is confined within a chamber which extends from the die to the cutting head so that the blast is concentrated and more directly related to the counter-current advance of the material.

In cutting dough extruded through dies heretofore, it was found almost impossible to square-cut the dough because it was not cool and dry enough so to cut without sticking, closing the ends, cracking, and deformation. Therefore, it was tried to cut the dough on the slant with some improvement but not much. However, with the new method, the dough can be cut in either fashion with practically no cracking, sticking, or closing the ends at all. It has not been hitherto realized how much of the extruded material has been wasted and how much production can be speeded up by the novel method and how much macaroni can be saved.

The machine illustrated in the drawings and employed to carry out the method is only one of several embodiments which may be used but has functioned satisfactorily and successfully when tested in practical operations. It generally comprises an extrusion die, an air cooling-drying chamber, preferably immediately beneath said die, to direct controlled currents of air on the freshly extruded material, an open casing below the air chamber into and through which the material passes to reach a cutting head located a substantial distance below the die. In this casing, the material is subjected to another upwardly directed blast of air as it descends so that it is cooled and dried thoroughly on the outer surface and within the tubular interior thereof. The degree of drying and cooling is regulated so that the extruded tube or filament of macaroni dough is firm enough to take a square-cut from the cutter blade without cracking, sticking, or closing the ends. Below the cutter head is disposed a trough to receive the cut material which passes it to a bin or storage receptacle.

The product made by the novel method and machine is a square-cut section or unit of macaroni which is square-cut with a knife, which is firm and open ended, with uncracked ends, thoroughly dried inside and out and when packed will not break or crack in packaged form and will thus retain its consistent quality until used. This is an exceptional advantage as is evident to those who have used macaroni in either long or short lengths when the material has been of inferior grade or improperly prepared because the lengths or sections become cracked and broken and as a consequence in a short time lose their quality and flavor.

Referring more specifically to the accompanying drawings illustrating an embodiment of the present invention capable of producing the present useful and novel product, it is to be noted that the material in the form of dough of required or desired consistency is fed from a reservoir A through an extrusion die B, then to a cutter head C removed or located a substantial distance therefrom, and finally on to an inclined feed trough or chute D leading to a shaker, etc. and finally to suitable storage bin or other receiver, etc.

The die B is of the usual form and receives dough from the hopper A through pipe 10. After extrusion through the die B, the tubular material or filaments passes through a ring-like casing 11 which has a plurality of apertures 12 in its walls to admit cooling and cooling-drying air into the open interior of the casing to pass across the material or filaments to initiate the cooling and drying thereof. It has been found that satisfactory results have been achieved by having the apertures in the form of about 100 outlet ports or holes to provide a substantially uniform distribution of air around the filaments of macaroni. Air is admitted through these entry apertures by means of an air pipe 13 connected to a blower 14.

The extruded material passes by gravity down through the casing 11 through a cooling and drying chamber having enclosing walls 15. Near the bottom of this chamber is disposed the cutting head C which is a cast plate 16 having a plurality of apertures 17 through each of which passes one or more of the macaroni filaments. Across the bottom of the head 16, a cutter knife 18 is rotatably mounted and the relation of the bottom of the head and the form of the knife is such as to make a square cut across the filaments. The speed of rotation of the knife may be adjusted with respect to the speed of advance of the filaments so as to determine thereby the length of the cut sections or units. The knife is mounted on a vertical rotary shaft 19 journalled in the head and having a bevel gear 20 at the top meshing with a similar gear 21 on a shaft leading to a reduction gear box 22. From the gear box, a shaft 23 extends on which is mounted a pulley 24 operated by belt 25 leading to a pulley 26 on a shaft 27. On the other end of shaft 27 is a pulley 28 connected by belt 29 to a pulley 30 on shaft 31 of drive motor 32. The meshing bevel gears 20 and 21 are covered by a dome-like cap 33 to protect them from contact from the macaroni filaments in their passage through the device.

Surrounding the cutter head C is an annular hollow casing 34 having inwardly sloping upper walls 35 and provided with a series of air apertures 36 on the upper inner wall thereof so that air within the casing 34 can be projected outwardly and upwardly across the advancing filaments as clearly illustrated in Fig. 1. The air is introduced into the interior of the air casing or chamber 34 by means of pipe 37 extending from a blower 38. Thus, it will be seen that within the casing walls 15 the air blown upwardly through apertures 36 is directed and controlled to pass upwardly across and along the filaments to further cool and dry them. This section will tend to achieve that degree of dryness both within and without the tubular filaments which permits them to be square-cut without any substantial deformation from a circular cross section so that the interior of the material is freely open to the air while being manufactured and after that while being packed and stored in packages for sale.

As shown in Figs. 4 and 5, the extruded macaroni filament in being cut is made oval from the original circular shape, but is not squeezed tightly together as was the case in prior and conventional methods and machines where the material is not sufficiently cool and dry before being cut, especially when a square-cut operation is used. The sides of the square-cut macaroni unit are straight as will be observed from Fig. 4. After the material is cut, it drops upon a sloped screen D and by gravity passes through a conduit 39 to a storage bin or to suitable packaging equipment (not shown).

It is to be observed that the present invention provides an improved machine in which one embodiment of the novel method is exemplified and in which the macaroni material is passed through an extrusion zone, then through an ample cooling and drying zone, and then through a cutting zone. From the time the macaroni material leaves the extrusion zone until it is cut and drops into a hopper or other position, it is subjected to a direct controlled stream of air of any desired temperature and humidity so that the resultant product is a substantially square-cut section or unit, firm and uniform in consistency, and without split or cracked or deformed ends.

For the purpose of giving those skilled in the art a better understanding of the invention, the following illustrative example is given:

Macaroni dough made from suitable flour, preferably semolina, is stored in reservoir A. Generally speaking, such dough has a temperature of about 100° F. or so. When the macaroni is extruded from die B, it comes out at a temperature of about 110° F. and with a moisture content of about 29%. The extruded filaments of macaroni preferably pass downwardly in a vertical direction through a cooling-drying chamber. Just underneath the extrusion die, the macaroni filaments are subject to a blast of air having a temperature of about 80° F. to about 90° F. coming from the atmosphere and through the annular or ring-like casing 11 which can be termed a cooling-drying collar which reduces the temperature of the filaments to about 90° F. or so. This blast of air cools and dries the outside of the macaroni filaments and forms a light crust. Generally speaking, the moisture content is reduced to about 25% or so. It has been discovered that the macaroni filaments as thus cooled and dried with a crust hardened outside surface can be cut clean with a knife, preferably a straight one or flat cutter capable of making a clean cross-cut without cracking, sticking, or closing the ends. In association with the cutting operation, it is preferred to provide another blast of air from the annular or ring-like casing 34. The air from this blast comes from the atmosphere surrounding the machine and usually has a temperature of about 80° F. but on a hot day may be as high as about 90° F. or so, which cools the macaroni filaments prior to cutting and further hardens and dries both the outside and inside and forms a light crust on the filaments which prevents sticking during the cutting operation. The moisture content is further reduced usually to about 23.5% or so. By the time the square-cut macaroni units or products are ready for packing and sale, the moisture content is still further reduced, usually about 11% or so.

It is to be observed that the present invention provides an improved method of making square-cut macaroni units which are dried both on the outside and inside as pointed out in great detail hereinbefore. The blasts of cooling-drying air which are admitted via air pipe 13 and the annular or ring-like casing 34 via apertures 36 blow across the filaments of macaroni which are moving downwardly from die B to cutter C. During the passage from die B to cutter C, the filaments have their moisture content first reduced from about 29% or so to about 25% or so and then further reduced to about 23.5% or so. The blasts of cooling-drying air blowing across the filament first dry the outside thereof, then the thin walls, and finally the inside. As is well known by those skilled in the art, the removal of moisture from the outside of the macaroni filament causes the moisture to flow through the thin walls from the inside to the outside. In this manner, the filaments are dried both on the outside and inside and a light crust is formed on the outside of the filament. After cutting, the square-cut macaroni can then be dried in any suitable manner well known to those skilled in the art which still further reduces the moisture content to about 11% or so.

When the air blasts have been omitted, it has been found that the hole within the filament or open end becomes closed and makes it practically impossible to dry the macaroni properly. In fact, the closing of the hole and open end makes it impractical to remove the moisture from the interior of the macaroni and causes it to "check." As those skilled in the art fully appreciate, checked macaroni is unfit to be sold and is a loss to the manufacturer.

After the macaroni is cut, it goes down trough or chute D and into a shaker (not shown) which is well known to those skilled in the art. Underneath the shaker, there is a motor with an attached blower which blows air on the shaker and which cools the macaroni still further to form a hardened crust on the inside and outside of the cut units. By hardening in this manner, the macaroni units or product is protected against bending and marking as it is handled and as it goes through all of the operations.

The term "square cut" macaroni units means units which are cut squarely or transversely across the macaroni filament. Similarly, "square cutting" means cutting squarely or transversely across the tubular filament. The square or transverse cut units may be clearly seen in Figs. 2 and 4 of the drawings.

Although the present invention has been described in conjunction with a preferred embodiment, it is to be understood that modifications and variations may be resorted to without departing from the spirit and scope of the invention, as those skilled in the art will readily understand. Thus, air for the blowers for cooling and drying the macaroni can be introduced at selected temperatures and/or humidities from air-condition equipment, or the new machine for making square-cut macaroni units can be installed in an air-conditioned room which can be maintained at selected temperatures and/or humidities to facilitate the cooling and/or drying of the extruded macaroni filaments or the square-cut macaroni units. Such variations and modifications are considered to be within the purview and scope of the claims.

I claim:

1. In a machine for making cut and dried tubular macaroni units, the combination comprising a reservoir for doughy macaroni material, an extrusion die for producing a plurality of tubular macaroni filaments mounted in the bottom of said reservoir, an air cooling-drying chamber located beneath said extrusion die to direct controlled currents of cooling-drying air on freshly extruded tubular macaroni filaments to cool and dry the same, a cutting head located at a substantial distance below said die and said cooling-drying chamber, an open casing below said cooling-drying chamber into and through which the material passes to reach said cutting head, an annular hollow casing surrounding said cutting head and provided with a series of air apertures to blow directed and controlled cooling-drying air to pass upwardly across said tubular macaroni filaments to further cool and dry said filaments firm enough to take cutting without cracking, sticking, or closing the ends, a cutter blade rotatably mounted in said cutting head for cutting said cooled-dried filaments into a plurality of tubular macaroni units without any substantial deformation from a circular cross section so that the interior of said units is freely open to air while being manufactured, packed, and stored, and a trough positioned below said cutting head to receive said cut and dried tubular macaroni units and to pass the same to a storage receptacle.

2. In a machine for making cut and dried tubular macaroni units, the combination comprising a reservoir for doughy macaroni material, an extrusion die for producing a plurality of tubular macaroni filaments mounted in the bottom of said reservoir, an air cooling-drying chamber located beneath said extrusion die to direct controlled currents of cooling-drying air on freshly extruded tubular macaroni filaments to cool and dry the same, air blowing means directly connected with said air chamber for providing cooling-drying air, a cutting head located at a substantial distance below said die and said cooling-drying chamber, an open casing below said cooling-drying chamber into and through which the material passes to reach said cutting head, an annular hollow casing surrounding said cutting head and provided with a series of air apertures to blow directed and controlled cooling-drying air to pass upwardly across said tubular macaroni filaments to further cool and dry said filaments firm enough to take cutting without cracking, sticking, or closing the ends, supplemental air blowing means directly connected with said annular casing for providing supplemental cooling-drying air, a cutter blade rotatably mounted in said cutting head for cutting said cooled-dried filaments into a plurality of tubular macaroni units without any substantial deformation from a circular cross section so that the interior of said units is freely open to air while being manufactured, packed, and stored, and a trough positioned below said cutting head to receive said cut and dried tubular macaroni units and to pass the same to a storage receptacle.

3. In a machine for making cut and dried tubular macaroni units, the combination comprising an extrusion die for producing a plurality of tubular macaroni filaments, an air cooling-drying chamber located immediately beneath said extrusion die to direct controlled currents of cooling-drying air on freshly extruded tubular macaroni filaments to cool, dry and harden the same to form a light crust on the outside of said tubular macaroni filaments, a cutting head located at a substantial distance below said die, a plurality of apertures provided in said cutting head, each of said apertures capable of passing a plurality of tubular macaroni filaments, an annular hollow casing surrounding said cutting head and provided with a series of air apertures to blow directed and controlled air to pass upwardly across said tubular macaroni filaments to further cool and dry said filaments firm enough to take cutting without cracking, sticking, or closing the ends, and a cutter blade rotatably mounted in said cutting head for cutting said cooled-dried filaments into a plurality of tubular macaroni units without any substantial deformation from a circular cross section so that the interior of said units is freely open to air while being manufactured, packed, and stored.

4. An improved method of producing cut and dried macaroni units which comprises extruding doughy macaroni material in an extrusion zone to produce a plurality of extruded tubular macaroni filaments, subjecting said tubular macaroni filaments to cooling-drying air to cool and dry the outer surface and the tubular interior of said filaments and to form a light crust on the outside of said tubular macaroni filaments firm enough to take cutting without cracking, sticking, or closing the cut ends of the tubular filaments, moving said extruded tubular macaroni filaments a substantial distance from said extrusion zone while continuing to subject said filaments to cooling-drying air to fully harden the outside of said crusted tubular macaroni filaments, and cutting at a substantial distance from the extrusion zone said hardened tubular macaroni filaments across the same to produce cut and dried tubular macaroni units.

5. An improved method of producing cut and dried tubular macaroni units which comprises extruding doughy macaroni material in an extrusion zone to produce a plurality of extruded tubular macaroni filaments, immediately subjecting said tubular macaroni filaments underneath said extrusion zone to cooling-drying air to cool and dry said tubular filaments and to form a light crust on the outside of said tubular macaroni filaments firm enough to take cutting without cracking, sticking, or closing the tubular ends, moving said extruded tubular macaroni filaments away from said extrusion zone, thereafter blowing supplemental cooling-drying air across said filaments to further cool and dry the same and to fully harden the outside of said crusted tubular macaroni filaments, and finally cutting at a substantial distance from the extrusion zone said cooled and dried tubular macaroni filaments having a hardened crust thereon across said filaments to produce cut and dried tubular macaroni units.

6. An improved method of producing cut and dried macaroni units which comprises extruding doughy macaroni material in an extrusion zone at a temperature of about 100° F. in a vertical downward direction to produce a plurality of extruded tubular macaroni filaments having a moisture content of about 29%; subjecting said downwardly-moving, tubular macaroni filaments to cooling-drying air to cool said filaments to about 90° F. and to dry said filaments to a moisture content of 25% and to form a light crust on the outside of said tubular macaroni filaments; passing said cooled and dried filaments with a crust-hardened outside surface downwardly and away from said extrusion zone for a substantial distance; subjecting said downwardly-moving, crusted tubular macaroni filaments to cooling-drying air to further dry both the outside and inside of said filaments to further reduce the moisture content to about 23.5% and to harden said filaments and make them firm enough to take cutting without cracking, sticking, or closing the tubular ends; and cutting said hardened tubular macaroni filaments at a cutting zone located at a substantial distance from said extrusion zone across the said filaments whereby cut and dried tubular macaroni units are produced which are freely open on both ends, firm in texture, evenly dried and substantially consistent throughout both on the inside and outside.

7. An improved method of producing cut and dried macaroni units which comprises extruding doughy macaroni material in an extrusion zone at a temperature of about 100° F. in a vertical downward direction to produce a plurality of extruded tubular macaroni filaments having a moisture content of about 29%; blowing a stream of cooling-drying air across said downwardly-moving, tubular macaroni filaments to cool said filaments to about 90° F., to dry said filaments to a moisture content of 25%, and to form a light crust on the outside of said tubular macaroni filaments; passing said cooled and dried filaments with a crust hardened outside surface downwardly and away from said extrusion zone; then subjecting said extruded tubular macaroni filaments at a substantial distance from the extrusion zone and just above the cutting zone to a blast of air to further dry both the outside and inside of said filaments, to further reduce the moisture content to about 23.5%, and to harden said filaments and make them firm enough to take cutting without cracking, sticking, or closing the tubular ends; cutting said hardened tubular macaroni filaments at a cutting zone located at a substantial distance from said extrusion zone across the said filaments whereby cut and dried tubular macaroni units are produced which are freely open on both ends, firm in texture, evenly dried and substantially consistent throughout both on the inside and outside; and still further reducing the moisture content of said units to about 11% before packing.

JOSEPH PELLEGRINO.

References Cited in the file of this patent

UNITED STATES PATENTS

| Number | Name | Date |
| --- | --- | --- |
| Re. 15,474 | Block | Oct. 24, 1922 |
| 855,438 | Ebel | May 28, 1907 |
| 1,220,205 | Desmaris | Mar. 27, 1917 |
| 1,434,935 | Von Steiger | Nov. 7, 1922 |
| 1,487,323 | Fontana | Mar. 18, 1924 |
| 2,149,920 | Kretchmer | Mar. 7, 1939 |
| 2,245,308 | Thalmann | June 10, 1941 |